Figure 1:
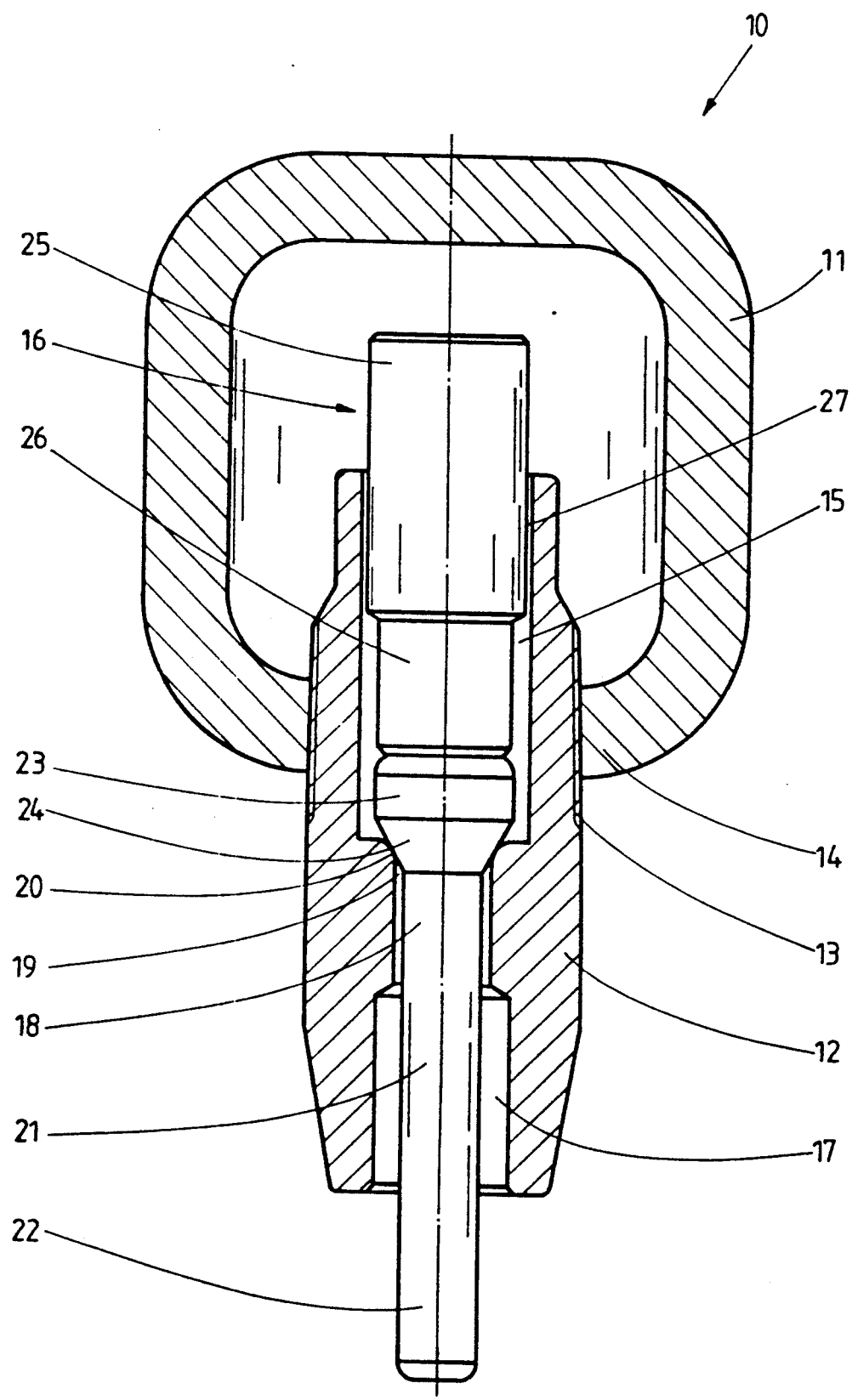

United States Patent [19]
Schumacher

[11] Patent Number: 5,329,877
[45] Date of Patent: Jul. 19, 1994

[54] WATERING VALVE FOR SMALL ANIMALS HAVING VARIABLE FLOW RATES

[75] Inventor: Egon Schumacher, Barnstorf, Fed. Rep. of Germany

[73] Assignee: Lubing Maschinenfabrik Ludwig Benign GmbH & Co. KG, Fed. Rep. of Germany

[21] Appl. No.: 927,496

[22] PCT Filed: Feb. 1, 1992

[86] PCT No.: PCT/EP92/00221

§ 371 Date: Sep. 28, 1992

§ 102(e) Date: Sep. 28, 1992

[87] PCT Pub. No.: WO92/13445

PCT Pub. Date: Aug. 20, 1992

[30] Foreign Application Priority Data

Feb. 9, 1991 [DE] Fed. Rep. of Germany ... 9101513[U]

[51] Int. Cl.$^5$ .............................................. A01K 7/00
[52] U.S. Cl. ................................. 119/72.5; 138/46; 222/289; 222/322; 222/422
[58] Field of Search ............... 119/72.5, 72; 222/288, 222/289, 422, 322; 138/45, 46

[56] References Cited

U.S. PATENT DOCUMENTS

| 997,939 | 7/1911 | Wahl | 222/322 |
|---|---|---|---|
| 3,590,781 | 7/1971 | Spencer | 119/72.5 |
| 3,750,628 | 8/1973 | Schumacher | 119/72.5 |
| 3,756,199 | 9/1973 | Clark, IV | 119/72.5 |
| 4,089,350 | 5/1978 | Gustin | 119/72.5 |
| 4,187,804 | 2/1980 | von Taschitzki | 119/72.5 |
| 4,370,948 | 2/1983 | Atkins | 119/72.5 |
| 4,819,585 | 4/1989 | Dolan et al. | 119/72.5 |
| 5,131,622 | 7/1992 | Chang | 119/72.5 |
| 5,154,138 | 10/1992 | Siddiqui et al. | 119/72.5 |

FOREIGN PATENT DOCUMENTS

| 0332852 | 9/1989 | European Pat. Off. | A01K 7/06 |
|---|---|---|---|
| 3619394 | 1/1988 | Fed. Rep. of Germany | 119/72.5 |
| 8804053 | 7/1988 | Fed. Rep. of Germany | A01K 7/06 |
| 2337843 | 8/1977 | France | F16K 1/52 |
| 1128613 | 9/1968 | United Kingdom | F15C 3/00 |
| WO8911218 | 11/1989 | World Int. Prop. O. | A01K 7/06 |

Primary Examiner—Gene Mancene
Assistant Examiner—Todd E. Manahan
Attorney, Agent, or Firm—Cook, Egan, McFarron & Manzo

[57] ABSTRACT

The watering valve (10) according to the invention is designed for feeding of water to the chickens according to their need for water in such a way that a flow restriction section (27) which is formed between an upper pin (16) and a part of the housing (12) associated therewith is variable in order to set different water flow rates. For this purpose, the upper pin (16) is provided with portions (25, 26) of different diameters. A variation of the relative position of this upper pin (16) in the housing (12) makes it possible to enlarge or reduce this flow restriction section (27). Accordingly, a smaller or greater quantity of water (per unit of time) can flow out of the watering valve.

17 Claims, 6 Drawing Sheets

WATERING VALVE FOR SMALL ANIMALS HAVING VARIABLE FLOW RATES

DESCRIPTION

The invention relates to a watering valve for small animals, especially chickens, having a housing which is connectable to a water supply means and a valve pin and, above the valve pin, an upper pin located in the housing, the upper pin and the part of the housing associated therewith forming a flow restriction section.

This type of watering valve is used for the keeping of livestock on a large scale, preferably of small animals such as chickens, and enables the small animals to independently satisfy their need for water. The watering valve is opened by moving a valve pin disposed therein from the actuating end of the pin, and the watering valve is closed automatically as soon as the small animal breaks off contact with the actuating end of the valve pin.

Such a watering valve is already known from DE-GM 88 04 053. This valve has a housing which is connectable to a water supply means and a valve pin mounted in the housing and comprising an actuating end projecting from the housing. The valve pin is liftable or pivotable for the release of drinking water. A cylindrical upper pin is arranged above the valve pin and is axially displaceable within an enlarged bore portion of the housing. The upper pin and the part of the housing which is associated therewith form a flow restriction section which sets the flow rate of the water to a certain value. As a result, a constant flow of water flows out of the watering valve whenever the valve pin is actuated. As the animals grow, their need for water changes. The known watering valve does not allow for this changing need for water as it only dispenses a certain quantity of water per unit of time. As a result, the drinking water supply does not correspond to the needs of the animals, which is a drawback especially for the keeping of livestock on a large scale. Small chicks, for example, are provided with too much water when they actuate the watering valve, whereas the water needs of older birds can only be satisfied with long drinking periods.

In view of the foregoing, the invention is based on the object to create a watering valve of the type described above which ensures a water supply which meets the water needs of the animals, especially of animals of different ages, by simple means.

According to the invention, this object is attained by forming a variable flow restricting section from the upper pin and the part of the housing associated therewith. As a result, tile quantity of water flowing out of the watering valve per unit of time can be varied in a simple manner, i.e. it can be adapted to tile needs of the animals.

In a preferred embodiment of the invention, the upper pin has a plurality of portions having different cross sections. The cross sect ions are selected such that the upper pin can be inserted into the housing in different relative positions.

Preferably, the cross sections of the portions have an identical geometric shape but a different surface area. Because of technical reasons, the cross sections of the portions have a preferably circular shape, i.e. the upper pin is a recessed cylindrical pin.

The flow restriction section of the watering valve is formed from the portion of the upper pin which has a greater surface area and the associated part of the housing, or, to be more precise, from the length of the portion with the greater diameter which interacts with the housing. The flow restriction effect with respect to the quantity of water flowing through the watering valve is based on the small annular gap between the housing and the portion of the upper pin which has the greater surface area. According to the findings of the invention, however, the flow restriction effect depends above all on the length of the portion with the greater surface area which interacts with the housing. A greater length effects a small water flow rate and vice versa. A change of the water flow rate can thus be attained by a variation of the relative position of the upper pin in the housing. For this purpose, the upper pin only has to be reversed in the housing, the portions with different surface areas preferably having different lengths. The lengths must be selected such that a reversal of the upper pin effects a change of the length of the flow restriction section which causes the desired change of the rate of flow of the water.

According to one embodiment of the invention, the portion with the greater surface area corresponds to the maximum depth of insertion of the upper pin into the housing. The portion with the greater surface area is preferably twice as long as the portion with the smaller surface area.

The portions may also have a cross-sectional shape which is not circular or they may even have geometric shapes which are different from one another. The portions may have a rectangular or square shape or the shape of a segment of a circle and similar shapes. The crucial point is that the design of the enlarged bore portion of the housing always corresponds to the design of the portion with the greater surface area, since they both form the flow restriction section. The portions with a smaller surface area are designed such that they do not interfere with the interaction of the housing with the portion with a greater surface area.

The upper pin may also be recessed several times and, consequently, have more than two portions which may even be arranged asymmetrically relative to one another. According to another embodiment, the upper pin is designed as a cylindrical pin which has a uniform diameter, whereas the part of the housing which forms the flow restriction section together with the upper pin has different portions and is preferably designed as a sleeve which is releasably connected to the housing. This sleeve has a uniform outside diameter with which it can be inserted into the housing, that is to say into an enlarged bore portion of the housing which has appropriate dimensions. Moreover, the sleeve is provided with at least two different inside diameters, preferably such that the portion with the smaller diameter extends over about two thirds and the portion with the greater diameter extends over about one third of the length of the sleeve. Accordingly, different flow restriction effects can be attained by inserting the sleeve into the housing either with the portion with the smaller diameter first or with the portion with the greater diameter first. Different flow restriction effects may, however, also be attained by inserting sleeve elements with different inside diameters into the housing. In this case, however, the inside diameter of each individual sleeve element is uniform. In this embodiment, the modifications of the watering valve which are described in the foregoing with respect to the reduced upper pin can be applied with analogous designs and identical effects by means of inserting into the housing different sleeves (with appropriate different inside diameters), as required to attain the desired water flow rate from the watering valve.

The main advantage of the invention is that the water flow rate for the feeding of water to small animals can be varied in an extremely simple manner by merely changing the relative position of the upper pin or the sleeve in the housing. As a result, the small animals can independently release water in response to their water need which is a function of their stage of growth. This solution offers substantial advantages, especially for the keeping of small animals on a large scale.

Figure 2:
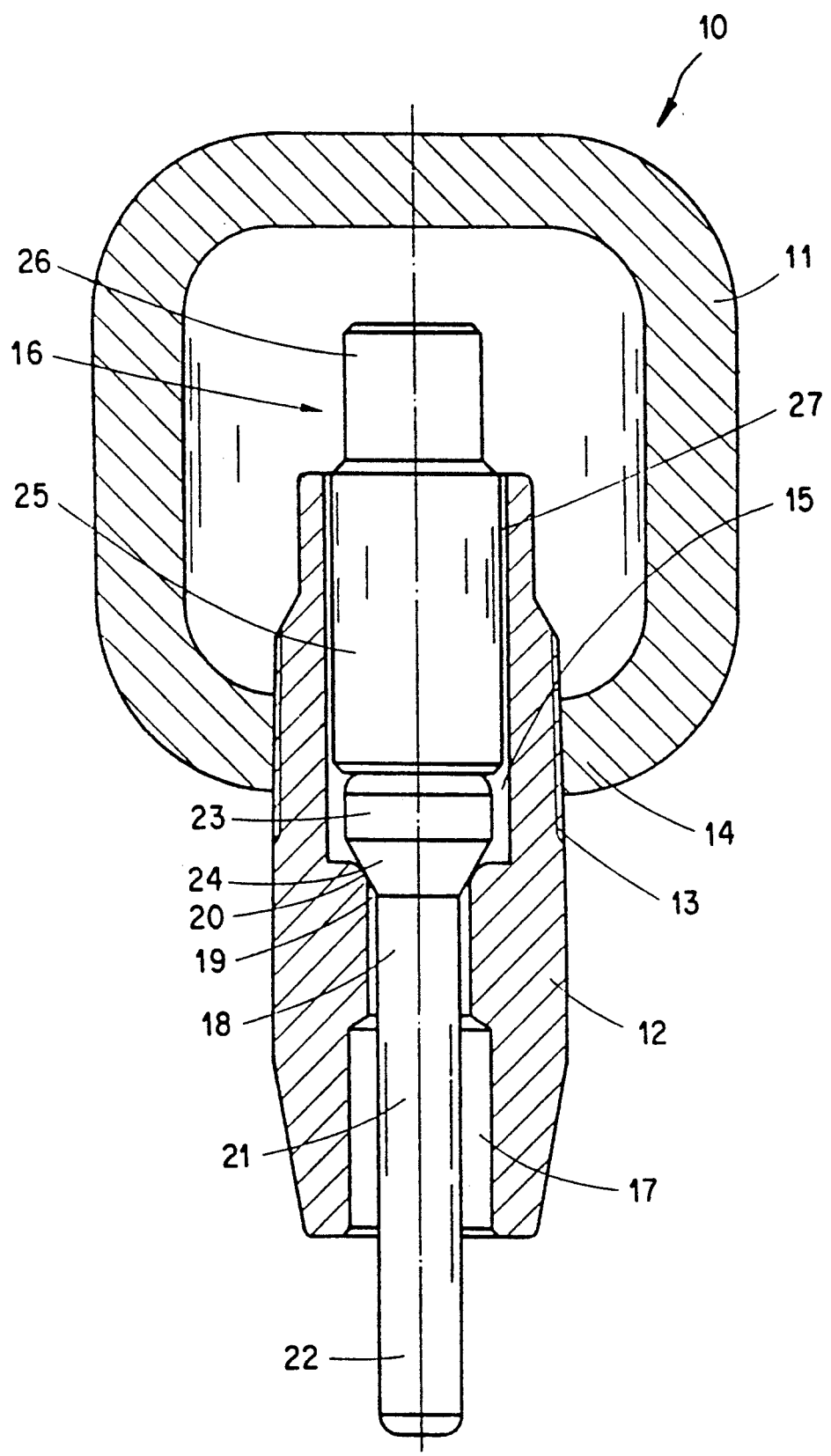
Figure 3:
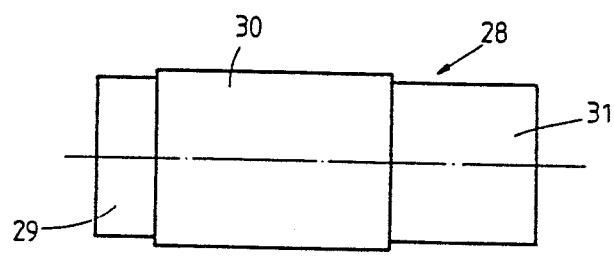
Figure 4:
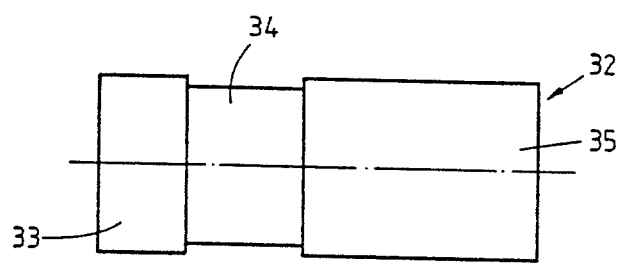
Figure 5:
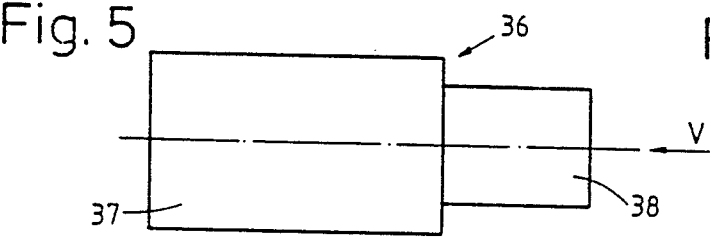
Figure 6:
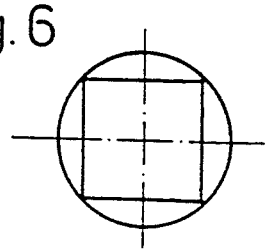
Figure 7:
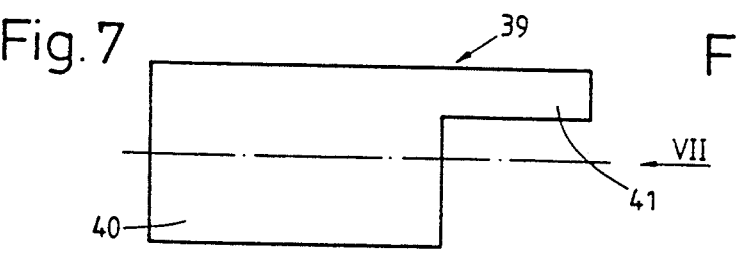
Figure 8:
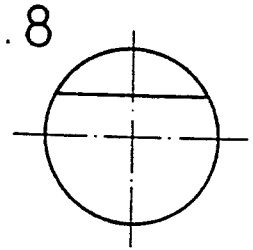
Figure 9:
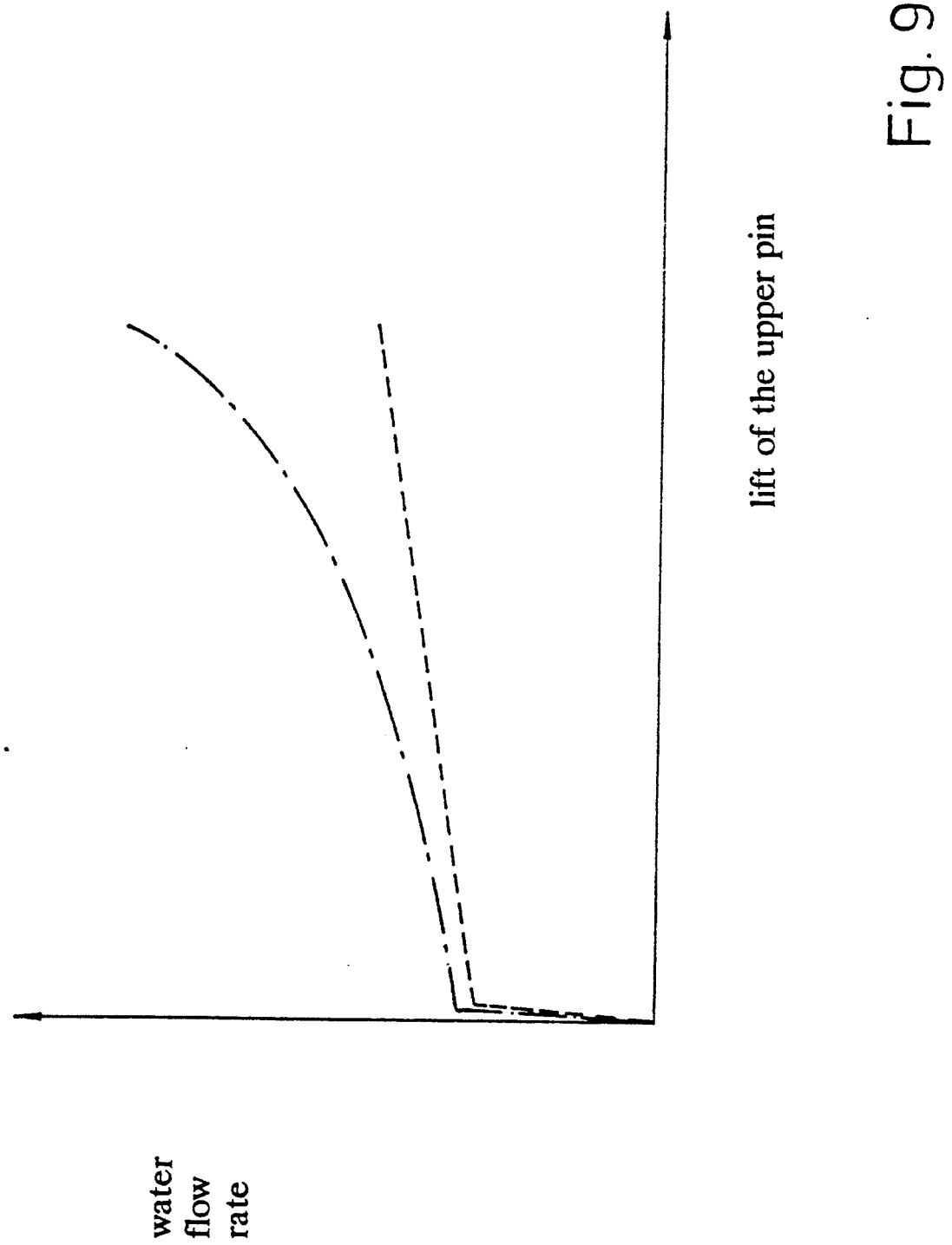
Figure 10:
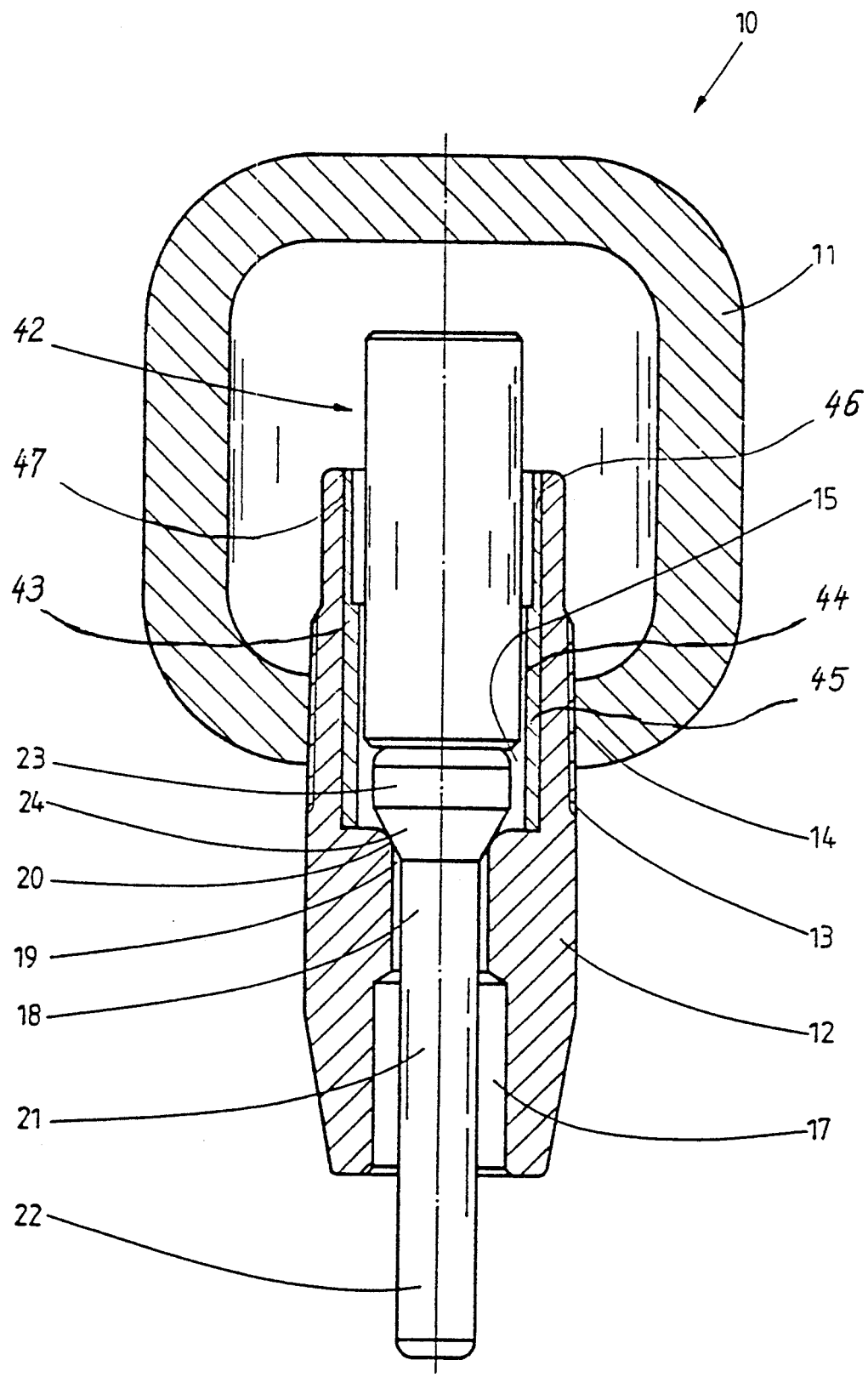
Figure 11:
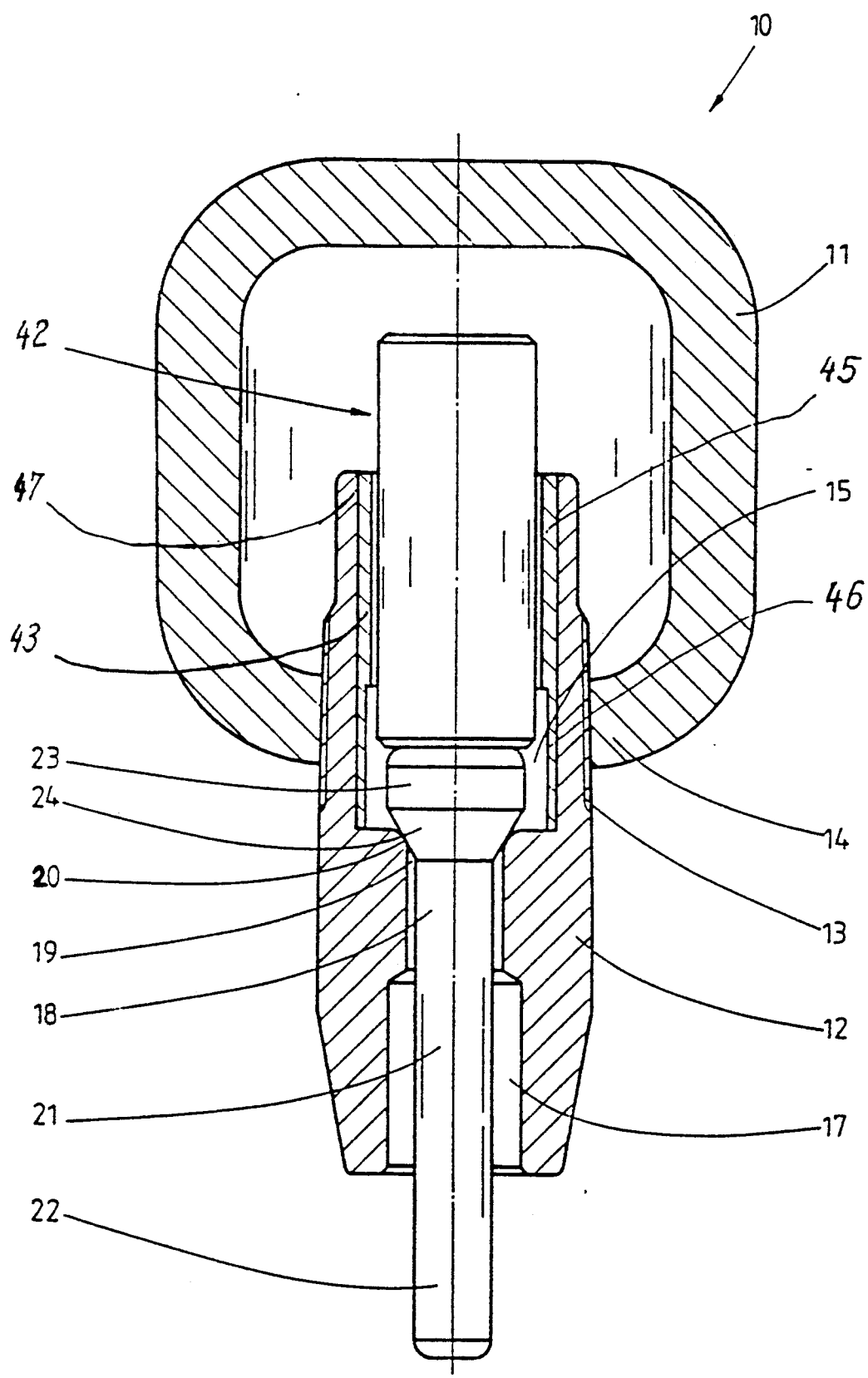

The invention will be described below in detail with respect to several preferred exemplary embodiments. In the drawings FIG. 1 shows, on an enlarged scale, a sectional view of a watering valve which has a valve pin and an upper pin and is screwed into a water supply means, FIG. 2 shows the watering valve according to FIG. 1 with a reversed upper pin, FIG. 3 shows a second exemplary embodiment of the upper pin, FIG. 4 shows a third exemplary embodiment of the upper pin, FIG. 5 shows a fourth exemplary embodiment of the upper pin, FIG. 6 shows a view V of the upper pin according to FIG. 5, FIG. 7 shows a further exemplary embodiment of the upper pin according to FIG. 1, FIG. 8 shows a view VII of the upper pin according to FIG. 7, FIG. 9 shows a diagram of the water flow rate in response to the lift of the upper pin, FIG. 10 shows the watering valve according to FIG. 1 with a recessed sleeve and a cylindrical upper pin, and FIG. 11 shows the watering valve according to FIG. 10 with a reversed sleeve.

The watering valve 10 illustrated in FIG. 1 is disposed for the feeding of water to young birds. For the keeping of livestock on a large scale, a plurality of such watering valves 10 are spaced apart and assigned to a water supply line 11.

The watering valve 10 has a substantially cylindrical housing 12. The ends of this housing are conically tapered. An external thread 13 is disposed between the tapered portions. The watering valve 10 is screwed into a corresponding tapped bore in the lower wall section 14 of the water supply line 11 by means of the external thread.

The inside of the housing 12 is provided with a through bore. At the top, this bore has an enlarged bore portion 15 for receiving an upper pin 16 and at the bottom, the bore has an enlarged bore portion 17 for extending the pivoting range of a valve pin 18. The remaining center portion 19 of the through bore opens out into the upper enlarged bore portion 15 via a radius 20. In the present exemplary embodiment, the diameter of the upper enlarged bore portion 15 is slightly greater than that of the lower enlarged bore portion 17.

The valve pin 18 is inserted in the housing 12. The valve pin 18 has a cylindrical valve stem 21 whose lower portion projects from the housing 12 and forms an actuating end 22. Opposite the actuating end 22, the valve stem 18 has a head 23 and a truncated cone-shaped transition 24 is located between the valve stem 21 and the head 23. The transition 24 of the valve pin 18 and the radius 20 of the housing 12 form a sealing arrangement with an annular sealing line to stop the flow of water through the watering valve 10 when the valve stem 21 is disposed in the housing 12 coaxially relative to the housing and is not in a lifted position.

The upper pin 16 is disposed in the upper enlarged bore portion 15 of the housing 12 coaxially relative to the center line of the housing 12 and is movable up and down coaxially relative to the housing. The upper pin 16 has two portions 25, 26 with different cross sections. In the exemplary embodiment of FIG. 1, the cross sections of the portions 25, 26 have the same geometric shape, in particular a circular shape. The portions 25, 26 have different diameters and thus different surface areas. The diameter of the portion 25 with the greater surface area is about 0.3 mm greater than the diameter of the portion 26 with the smaller surface area. The diameter of the upper enlarged bore portion 15 is 0.1 to 0.2 mm greater than the diameter of the portion 25. The lengths of the portions 25, 26 are also different. In the exemplary embodiment of FIGS. 1 and 2, the portion 25 is about twice as long as the portion 26. The length of the portion 25 approximately corresponds to the maximum depth of insertion of the upper pin 16 into the enlarged bore portion 15 of the housing 12.

As regards the desired and variable flow restriction effect, the portion 25 of the upper pin 16 preferably has a diameter of 5.8 mm and the portion 26 of the upper pin 16 has a diameter of 5.5 mm, whereas the diameter of the enlarged bore portion 17 of the housing 12 is preferably 5.95 mm. It is also important in this respect that the upper pin 16 has an overall length of 15 mm and the portion 25 has a length of 10 mm, whereas the portion 26 extends over the remaining 5 mm. To attain the desired flow restriction effect, the enlarged bore portion 15 must have a depth which allows the upper pin 16 to be inserted into the housing 12 by two thirds of its length, i.e. by 10 mm, when the valve pin 18 is located inside the housing 12. This is necessary because the desired maximum flow restriction effect is attained, when the portion 25 of 10 mm length of the upper pin 16 is fully inserted in the housing. The mode of operation of the watering valve is as follows:

When the valve pin 18 is disposed coaxially relative to the housing 12 and is not lifted, the sealing arrangement formed from the radius 20 and the transition 24 is closed, so that no water can flow through the watering valve 10. This position of the valve pin 18 in the housing 12 is supported by the upper pin 16 which bears on the head 23 of the valve pin 18. The force exerted on the head 23 is a result of time gravity of the upper pin 18. A force which is exerted by the water column on the upper flat surface of the upper pin 16 and which is a function of the height of the water level in the water supply line 11 adds to the former force.

When a bird touches the actuating end 22 of the valve pin 18 which projects from the bottom of the housing 12 with its beak and thus pivots or lifts the valve pin 18, the sealing arrangement opens and water flows through the watering valve 10. The rate of flow of the water depends on the relative position of the upper pin 16 in the enlarged bore portion 15 of the housing 12.

The portion 25 with the greater surface area of the upper pin 16 and the section of the enlarged bore portion 15 of the housing 12 which interacts with the portion 25 form a flow restriction section 27. The flow restriction effect mainly depends on the length of the flow restriction section 27, i.e. the effective length of the portion 25 or a part of the portion 25 located in the housing 12. The shorter the flow restriction portion 27, the smaller the flow restriction effect. In other words: The smaller the section of the enlarged bore portion 16 of the housing 12 which is filled by the portion 25 (with a greater diameter) of the upper pin 16, the shorter the flow restriction portion 27 and the greater the quantity of water which flows out of the watering valve 19 per unit of time. If the upper pin 16 is disposed in the housing 12 in such a relative position that its portion 26 with the smaller surface area bears on the head 23 of the valve pin 19, as illustrated in FIG. 1, only about half of the portion 25 is located within the enlarged bore portion 15. As a result, the water flow rate is relatively high.

If, on the other hand, the upper pin 16 is reversed as illustrated in FIG. 2 and is disposed in the housing 12 in a different relative position in which the portion 25 with the greater surface area bears on the head 23, approximately all of the portion 25 is located within the enlarged bore portion 15. In this case, the flow restriction section 27 has a greater length and the water flow rate is smaller than in the relative arrangement of the upper pin 16 as illustrated in FIG. 1.

Evidently, the control of the water flow rate mainly depends on the ratio of the lengths of the portions 25, 26. The dimensions of these portions always have to be defined such that different relative positions of the upper pin 16 in the housing 12 always effect different lengths of the flow restriction section 27 in accordance with the desired variation of the water flow rates.

Although it is convenient for manufacturing reasons to design the enlarged bore portion 15 cylindrically and not recessed and to design the upper pin 16 as a cylindrical pin with one recess (FIG. 1), it would be possible to design the upper pin 16 and a corresponding enlarged bore portion 15 in many different ways and still ensure a variation of the flow restriction section 27 in response to a variation of the relative position of the upper pin 16 in the enlarged bore portion 15.

An upper pin 28 may for example have a center portion 30 with a greater surface area as illustrated in FIG. 3 and, on each end of this center portion 30, a portion 29, 31 with a smaller surface area, with the cross sections of the portions 29, 30, 31 having identical, in particular circular, shapes. A variation of the water flow rate in response to a change of the relative position of the upper pin 28 is, however, only possible if the lengths of the portions 29, 31 are different and the section of the portion 30 which is located within the housing 12 has a different length in each relative position.

An upper pin 32 (FIG. 4) may also have two portions 33, 35 with cross-sectionally identical, for example circular, geometric shapes and identical surface areas which correspond to the enlarged bore portion 15. Between these portions 33, 35, there is disposed a portion 34 which has the same cross-sectionally geometric shape but a different surface area. To change the water flow rate, it is again necessary that the portions 33, 35 have different lengths.

FIGS. 5 and 6 illustrate a further embodiment of an upper pin 36. This upper pin 36 has a portion 37 with a circular cross section and a portion 38 with a square cross section. To obtain different lengths of the flow restriction sections 27, the portion 38 is shorter than the portion 37.

It would, however, also be possible (FIGS. 7 and 8) to provide an upper pin 39 with at least two portions 40, 41 of different lengths and cross-sectionally different geometric shapes and to dispose both portions 40, 41 asymmetrically relative to one another. The portion 40 has a circular cross section and the portion 41 has a cross section in the shape of a segment of a circle.

The fundamental principle is that the portion 25, 30, 33, 35, 37, 40 with a greater surface area has a cross-sectional shape which corresponds to that of the enlarged bore portion 16 and forms a flow restriction section 27 together with the latter. The lengths of the portions 25, 26, 29, 30, 31, 33, 34, 35, 37, 38, 40, 41 must be designed such that a variation of the relative position of the upper pin 26, 28, 32, 36, 39 affects a change of the length of the flow restriction section 27 and therewith of the water flow rate.

The portions 26, 29, 31, 34, 38, 41 with a smaller surface area may have a shape which is identical to or different from that of the portions 25, 30, 33, 35, 37, 40 with a greater surface area, but they must not interfere with the arrangement of the portions with a greater surface area 25, 30, 33, 35, 37, 40 in the enlarged bore portion 15 of the housing 12.

The diagram of FIG. 9 illustrates the water flow rate in response to the lift of the upper pin 16. The broken line illustrates the water flow rate when the upper pin 16 bears with its portion 25 with the greater diameter on the head 23 of the valve pin 18, as illustrated in FIG. 2. As is evident, a variation of the lift only insignificantly changes the water flow rate in proportion to the height of lift, which means the flow restriction effect is relatively strong in this position of the upper pin 16, even in the event of a relatively high lift of the upper pin 16.

The dash-dotted curve illustrates the water flow rate when the upper pin 16 bears with its portion 26 with the smaller diameter on the head 23 of the valve pin 18, as illustrated in FIG. 1. As is evident, the water flow rate in the case of a very small lift is only insignificantly higher than in the above described case, but then increases more and more and towards the end of the lift progressively increases much stronger. Since the portion 26 with the smaller diameter only extends over one third of the length of the upper pin 16, it is always ensured that at least a small part of the portion 25 of the upper pin 16 remains in the housing 12 and thus always maintains a flow restriction effect to avoid an undesirably high rate of water flow and to prevent contamination. In the embodiment illustrated in FIGS. 10 and 11, the watering valve 10 has a cylindrical upper pin 42 with a uniform cross section. A variation of the restriction of the water flow rate is attained by the interaction of the upper pin 42 with a sleeve 43 which has two portions 45, 46 of different inside diameters. A flow restriction section 44 is always present where the upper pin 42 forms an overlap with a portion 45 of the sleeve 43 which has a smaller inside diameter.

Accordingly, the flow restriction effect is small when the sleeve 43, as illustrated in FIG. 10, is inserted into the housing 12 of the watering valve 10 with the portion 45 first. In this case, the upper pin 42 only overlaps part of the portion 45. The flow restriction effect is strong and the water flow rate is small when the sleeve 43, as illustrated in FIG. 11, is inserted into the housing 12 with its portion 46 with a greater inside diameter first. In this case the upper pin 42 overlaps the entire portion 45 of the sleeve 43.

The lengths of the portions 45, 46 of the sleeve 43 are defined in response to the respective desired maximum or minimum flow restriction effect in such a way that the water flow rate in response to the lift of the upper pin 42 corresponds approximately to the diagram of FIG. 9. It would, of course, also be possible to provide the sleeve 43 with more than two different inside diameters. The sleeve 43 may also be divided in two or more individual sleeves with different inside diameters. In this case, the water flow rate can be varied in response to the sequence in which the individual sleeves are inserted into the housing 12.

The sleeve 43 or individual sleeves always have a uniform outside diameter with which they can be inserted into a corresponding enlarged bore portion 47 of the housing 12 and can be displaced in the axial direction relative to the housing 12.

According to a last alternative solution, a sleeve element with a uniform inside diameter is inserted into the housing 12. A variation of the flow restriction effect of the watering valve is effected by alternately inserting different sleeve elements with different inside diameters into the housing 12. Accordingly, the variation of the flow restriction effect is not based on a variation of the length of the flow restriction section 27, 44 but on a variation the cross-sectional area of the water passage between the housing 12 and the upper pin 42.

I claim:

1. A watering valve for small animals, comprising:
    a housing which is connectable to a water supply;
    a valve pin partially inserted in said housing and having a portion extending from said housing for an animal to touch to start a flow of water from said watering valve; and
    an upper pin located above said valve pin and at least partially inserted into a bore hole in said housing so as to form a flow restriction section between said upper pin and a portion of said bore hole directly adjacent to said upper pin, said upper pin having portions of different cross-sectional area wherein said upper pin is insertable into said bore hole in different positions relative to said bore hole such that for each position the flow restriction section will be of a different length in order to control the flow rate of water from said watering valve.

2. A watering valve according to claim 1 wherein said portions of the upper pin of different cross-sectional area have cross-sectionally identical shapes.

3. A watering valve according to claim 1 wherein said upper pin has two portions with different diameters and surface areas.

4. A watering valve according to claim 3 wherein said portion with the greater surface area is longer than said portion with the smaller surface area.

5. A watering valve according to claim 4 wherein said portion with the greater surface area is twice as long as said portion with the smaller surface area.

6. A watering valve according to claim 4 wherein said longer portion with the greater surface area at least corresponds to the maximal depth of insertion of said upper pin into the bore hole in the housing.

7. A watering valve according to claim 1 wherein said upper pin has two ends and a middle portion and wherein each end has a portion with a smaller surface area than said middle portion.

8. A watering valve according to claim 1 wherein said upper pin has a portion with a smaller diameter located between two portions with greater diameters and wherein said two portions with greater diameters have different lengths.

9. A watering valve for small animals, comprising:
    a housing which is connectable to a water supply;
    a valve pin partially inserted in said housing and having a portion extending from said housing for an animal to touch to start a flow of water from said watering valve;
    an upper pin located above said valve pin; and
    a sleeve inserted into a bore hole in said housing;
    wherein said upper pin is at least partially inserted into said sleeve so as to form a flow restriction section between said upper pin and a portion of said sleeve directly adjacent to said upper pin, said sleeve having portions of different cross-sectional area wherein said upper pin is insertable into said sleeve in different positions relative to said sleeve such that for each position the flow restriction section will be of a different length in order to control the flow rate of water from said watering valve.

10. A watering valve according to claim 9 wherein said sleeve has an inner wall and portions of said inner wall have cross-sectionally identical shapes.

11. A watering valve according to claim 9 wherein said sleeve has two portions with different diameters.

12. A watering valve according to claim 11 wherein said portion with the smaller inside diameter is longer than said portion with the greater inside diameter.

13. A watering valve according to claim 11 wherein said portion with the smaller inside diameter is twice as long as said portion with the greater inside diameter.

14. A watering valve according to claim 9 wherein said sleeve has two ends and a middle portion and wherein each end has a portion with a smaller surface area than said middle portion.

15. A watering valve according to claim 9 wherein said sleeve has a portion with a greater inside diameter located between two portions with smaller inside diameters and wherein said two portions with smaller inside diameters have different lengths.

16. A watering valve according to claim 9 wherein said upper pin has a uniform cross-section.

17. A watering valve according to claim 9 wherein said sleeve is formed from at least two individual sleeves of different inside diameters, said two individual sleeves being insertable into said bore hole in a variable sequence.

* * * * *